(12) United States Patent
Dufresne et al.

(10) Patent No.: US 7,883,050 B2
(45) Date of Patent: Feb. 8, 2011

(54) COMPOSITES WITH INTEGRATED MULTI-FUNCTIONAL CIRCUITS (75) Inventors: Ralph E. Dufresne, Auburn, WA (US); Quynhgiao N. Le, Bellevue, WA (US); David F. Feider, Renton, WA (US)

(73) Assignee: The Boeing Company, Chicago, IL (US)

( * ) Notice: Subject to any disclaimer, the term of this patent is extended or adjusted under 35 U.S.C. 154(b) by 804 days.

(21) Appl. No.: 11/770,263

(22) Filed: Jun. 28, 2007

(65) Prior Publication Data

US 2009/0004480 A1 Jan. 1, 2009

(51) Int. Cl.
B64D 45/02 (2006.01)
H05F 3/00 (2006.01)

(52) U.S. Cl. ...................... 244/1 A; 361/218
(58) Field of Classification Search .................. 244/1 A, 244/121, 129.1, 133; 361/218
See application file for complete search history.

(56) References Cited

U.S. PATENT DOCUMENTS

| 3,416,027 | A | * | 12/1968 | Amason et al. ............... 315/36 |
| 3,906,308 | A | * | 9/1975 | Amason et al. ............. 361/218 |
| 4,630,168 | A | * | 12/1986 | Hunt ........................... 361/218 |
| 4,755,904 | A | | 7/1988 | Brick |
| 5,650,208 | A | * | 7/1997 | Chaussade et al. ............ 428/38 |
| 5,845,872 | A | | 12/1998 | Pridham et al. |
| 6,327,132 | B1 | * | 12/2001 | Andrivet et al. ............. 361/218 |
| 7,093,787 | B2 | | 8/2006 | Garrettson et al. |
| 2005/0150596 | A1 | | 7/2005 | Vargo et al. |
| 2005/0181203 | A1 | | 8/2005 | Rawlings et al. |
| 2007/0093163 | A1 | | 4/2007 | Brown |

FOREIGN PATENT DOCUMENTS

| EP | 1 473 227 A2 | 11/2004 |
| EP | 1 767 344 A2 | 3/2007 |
| WO | 01/39253 A2 | 5/2001 |
| WO | 2004/106160 A1 | 12/2004 |

* cited by examiner

Primary Examiner—Rob Swiatek (57) ABSTRACT

An aircraft component includes a composite structure and a metallic circuit on a film. The film is co-cured with the composite structure. The metallic circuit is patterned to dissipate energy generated by lightning strikes on the composite structure. The metal circuit is also patterned to provide connectivity for multi-function apparatus.

11 Claims, 6 Drawing Sheets

COMPOSITES WITH INTEGRATED MULTI-FUNCTIONAL CIRCUITS

TECHNICAL FIELD

The embodiments described herein generally relate to the field of composites used in aerospace, and more particularly relate to the integration of flexible circuits into the composites for a variety of functions, including lightning protection as a primary function, but also other functions.

BACKGROUND

Use of composites, such as carbon fiber reinforced plastics (CFRP), is becoming more common in aerospace applications for a many reasons including that composites allow designers to improve structural performance and reduce aircraft weight. Generally, composites include a reinforcing material embedded in a matrix of a polymeric composition. The reinforcing material may be oriented ply, woven fabric, particulates, or another form that provides suitable performance as a reinforcing material. The reinforcing material may be fiber glass, carbon fiber or other suitable reinforcement. The more typical polymer matrix material in aerospace applications is an epoxy resin but other polymers may also be suitable.

While composites have the advantage of low weight and high strength, the electrical properties of composites are very different from the metals that the composites often replace in aerospace applications, such as aluminum. Aerospace structural metals are generally highly conductive compared to composites. As a result, composites cannot distribute current and heat from a lightning strike (typical about 100,000 Amperes at 50,000 Volts) as quickly as metals.

Several techniques have been developed to provide lightning protection for composite structures. In general, these require the addition or incorporation of metallic conductors into composite exterior surfaces of the aircraft (such as skin panels on the wings and fuselage) capable of distributing and diverting current away from flight critical areas and underlying aircraft components. The addition of metallic conductors has been approached in two ways: the use of metallic appliqués and the integration of metal foil into the composite. Appliqué-based systems have alternate layers (sheets) of dielectric and conductive materials applied over the composite structure surface and secured to the surface with an adhesive. This both insulates underlying aircraft components from a lightning strike and provides a conductive path for rapid distribution and dissipation of lightning current and heat. The conductive layer is typically aluminum or copper foil, either in solid or expanded (open mesh) form. The alternating dielectric layers can be polyimides, fluoropolymers or similar heat resistant, durable, high dielectric strength materials. The integrated foil systems typically include copper or aluminum foil in either solid or expanded mesh form that is laminated into and co-cured with the composite material. This type of system provides a conductive path for diversion and distribution of lightning current which, in combination with special fasteners and other features, provides a degree of lightning protection for the composite structure.

It is desirable to develop further technologies that might shield or otherwise protect composite aircraft skin and underlying aircraft structure and components from current and voltage surges from a lightning strike, and that might in addition be able to perform other functions. The technology should be able to withstand ordinary conditions of aircraft use. In addition, the technology should be relatively robust and straightforward to implement in routine manufacturing processes. Furthermore, other desirable features and characteristics of the technology for lightning protection and other functions will become apparent from the subsequent detailed description and the appended claims, taken in conjunction with the accompanying drawings and the foregoing technical field and background.

BRIEF SUMMARY

An exemplary embodiment provides a composite substrate that includes a resin matrix that has embedded therein reinforcing filler and an embedded flex circuit. The flex circuit has a metallic circuit on a film that is co-cured with the resin matrix.

An exemplary embodiment provides a composite substrate including a resin matrix that has embedded therein a flex circuit and reinforcing filler. The flex circuit includes a metallic circuit on a film that is co-cured with the resin matrix. The metallic circuit is configured to dissipate energy generated by lightning strikes on the composite substrate.

Another exemplary embodiment provides a composite substrate that includes a resin matrix having embedded therein a multi-functional flex circuit and reinforcing filler. The multi-functional flex circuit has at least two flex circuit layers, each of which has a metallic circuit on a film. The film is co-cured with the resin matrix. The metallic circuit of at least one flex circuit layer is configured to dissipate energy generated by lightning strikes on the composite substrate.

A further exemplary embodiment provides a composite aircraft that has a composite substructure to which is fastened a composite substrate. The composite substrate includes a resin matrix that has embedded therein reinforcing filler and a multi-functional flex circuit. The multi-functional flex circuit includes at least two flex circuit layers with a dielectric layer interposed between each of the at least two flex circuit layers. A protective coating covers the outermost of the two flex circuit layers. Each flex circuit layer includes a metallic circuit on a film. The film is co-cured with the resin matrix. The metallic circuit of at least one flex circuit layer is configured to dissipate energy generated by lightning strikes on the composite substrate.

BRIEF DESCRIPTION OF THE DRAWINGS

Various embodiments will hereinafter be described in conjunction with the following figures, which are not to scale and which are for illustrative purposes, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description. While the following description deals mainly with aircraft, embodiments of the multi-functional circuitry may find application in other areas utilizing composite structural material systems including for example: automotive, railroad, and maritime applications to map and assess mechanical or thermal damage, trigger alarms, and evaluate structural and functional integrity of critical control systems.

Exemplary embodiments provide multi-functional flex circuitry laminated into and co-cured with a composite substrate to provide lightning protection by acting as diverter of lightning current. The multi-functional flex circuitry may also include tuned conductor circuitry specifically designed and optimized for specific application areas. In addition, the multi-functional flex circuitry may also provide aircraft designers with a stable, expandable platform, with all necessary connection capability, for addition and incorporation of embedded sensing devices needed for a variety of applications.

Exemplary embodiments of the multi-functional integrated flex circuitry may be incorporated into aircraft skin and structural components, for example an aircraft wing, fuselage, tail structures, empennage, nacelle, or nose. Some embodiments may include a structure that essentially replicates a multilayer circuit board with embedded devices and connectivity in three dimensions. The multi-functional flex circuitry may be fabricated in a variety of ways including for example by using the processes used for printed circuit board manufacture: photo-imaging and etching of a metallized dielectric substrate. Typically, and without limitation, the film may be polyimide, epoxy/glass, fluorocarbons such as Teflon® (TEFLON is a trademark of DuPont of Delaware), or other flexible material onto which conductive metal may be deposited in a thin shape-controlled layer to provide a circuit, and that may be incorporated into the composite by co-cure or by adhesion with an adhesive. Accordingly, other films that are compatible with the aircraft composite composition and other conductive metals may also be used. The metal conductor for the thin layer circuitry may be typically, without limitation, copper, aluminum, or a combination. The film and metal should desirably be selected to produce strong, flexible circuitry in the desired configuration and to comply with required mechanical and electrical requirements.

A film may be metallized and the metallized film may then be precision-etched to produce a thin metallic flex circuit by any of a number of techniques. Without limitation, for example, metallic circuits may be formed using photolithography techniques, to produce conductor patterns designed and optimized for lightning protection and/or other functions. The flex circuit so obtained may then be laminated and co-cured with composite (CFRP) material to produce an integrated self-contained system as a permanent part of the composite aircraft substrate (wing, skin panel, etc.). Of course, a layering of multiple flex circuits, each performing a different function, produces a multi-functional flex circuit. Electrical isolation between adjacent flex circuits may be controlled by interposing a dielectric film between them. Selective transfer of current and/or signals may be provided by means of vias or other suitable electrical interconnections that extend through the dielectric film layers.

In those embodiments where multi-functional flex circuitry is integrated into the composite aircraft structure, it may provide a multi-layered platform for addition of embedded components and sensors with all necessary connectivity to support additional functions aside from lightning protection. Non-limiting examples of sensors and components easily supported on integrated flex circuitry include: embedded passive readout devices (EPRDs), embedded active readout devices (EARDs), Rogowski coils for current measurement, thermopiles, thermistors, fuses, radio frequency identification devices (RFIDs) and strain gauges. These sensors and components deployed on and connected with multi-functional flex circuitry can provide a variety of applications in communications, mitigation of electromagnetic interference (EMI), and real time monitoring of the health and condition of lightning protection and other aircraft systems.

Exemplary embodiments of flex circuits may include a thin polymeric film that is compatible with the resin of the composite into which it is to be integrated, and a metallic circuit pattern formed on the film. As pointed out above, the film may be polyimide, epoxy, fluorocarbon, or some other dielectric material. The resin matrix of the carbon composite may be an epoxy, for example. The film may be of a suitable thickness to facilitate the manufacturing process used to apply the metallic circuit pattern and to allow manipulation of the flex circuit during set-up for the integration of the flex circuit into the composite by co-cure or other process. Generally, the film thickness will vary by film type and the size of the flex circuit. For example, a wing of a typical composite airplane may be laid up in 20 ft. sections to cover critical wing tank fasteners. The copper, aluminum, silver, gold, nickel or other conductive metal on the flex film substrate is typically 0.0014 to 0.003 in. thick.

Figure 1:
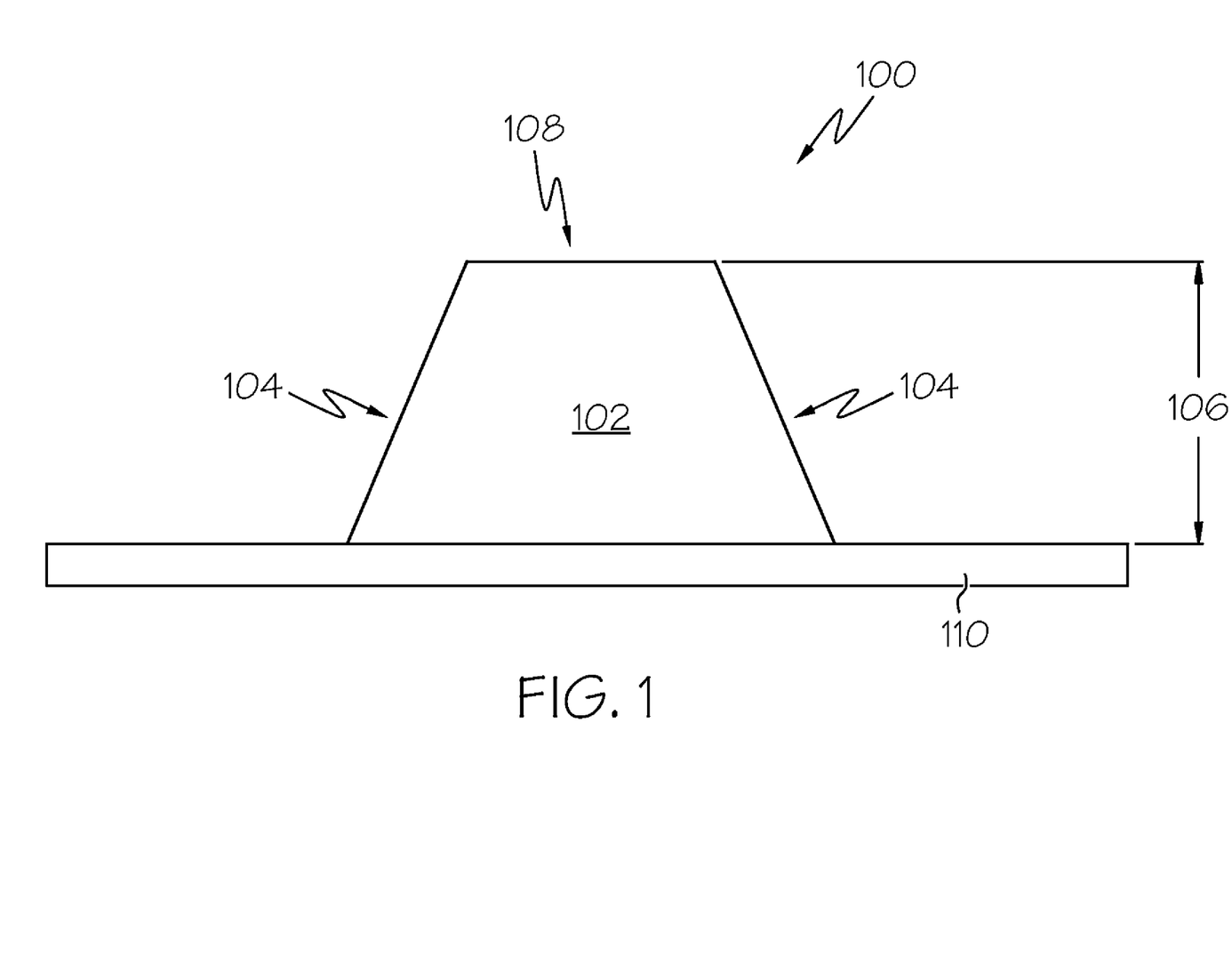
FIG. 1 is an illustration of a cross sectional view through a portion of an exemplary embodiment of a flex circuit produced by photolithography.

In an exemplary embodiment, the metallic circuit is applied to the polymer film by scaling up processes well-known in the semiconductor arts, such as photolithography. Other techniques may also be used, such as masking the polymer surface and spraying or otherwise depositing conductive metal onto unmasked surface areas to form the desired circuit. However, exemplary thin film circuits may be formed by photolithography, which produces well-defined low-stress metallic circuits. FIG. 1 illustrates an example of a cross sectional end view of a portion of a flex circuit 100 that includes a metallic film 102 produced by photolithography on a polymeric film 110. The metallic film has sharply-defined sides 104, a controlled height ("thickness") 106 and a flat top 108. Such metal circuit structures are readily formed using photolithography on a large scale, are readily replicated, and are especially compatible for co-curing into a carbon composite laminate. The tapered stress-relieved contours of conductor edges shown in FIG. 1 have markedly less tendency to nucleate cracking in surfacing materials and paint finishes.

Figure 2:
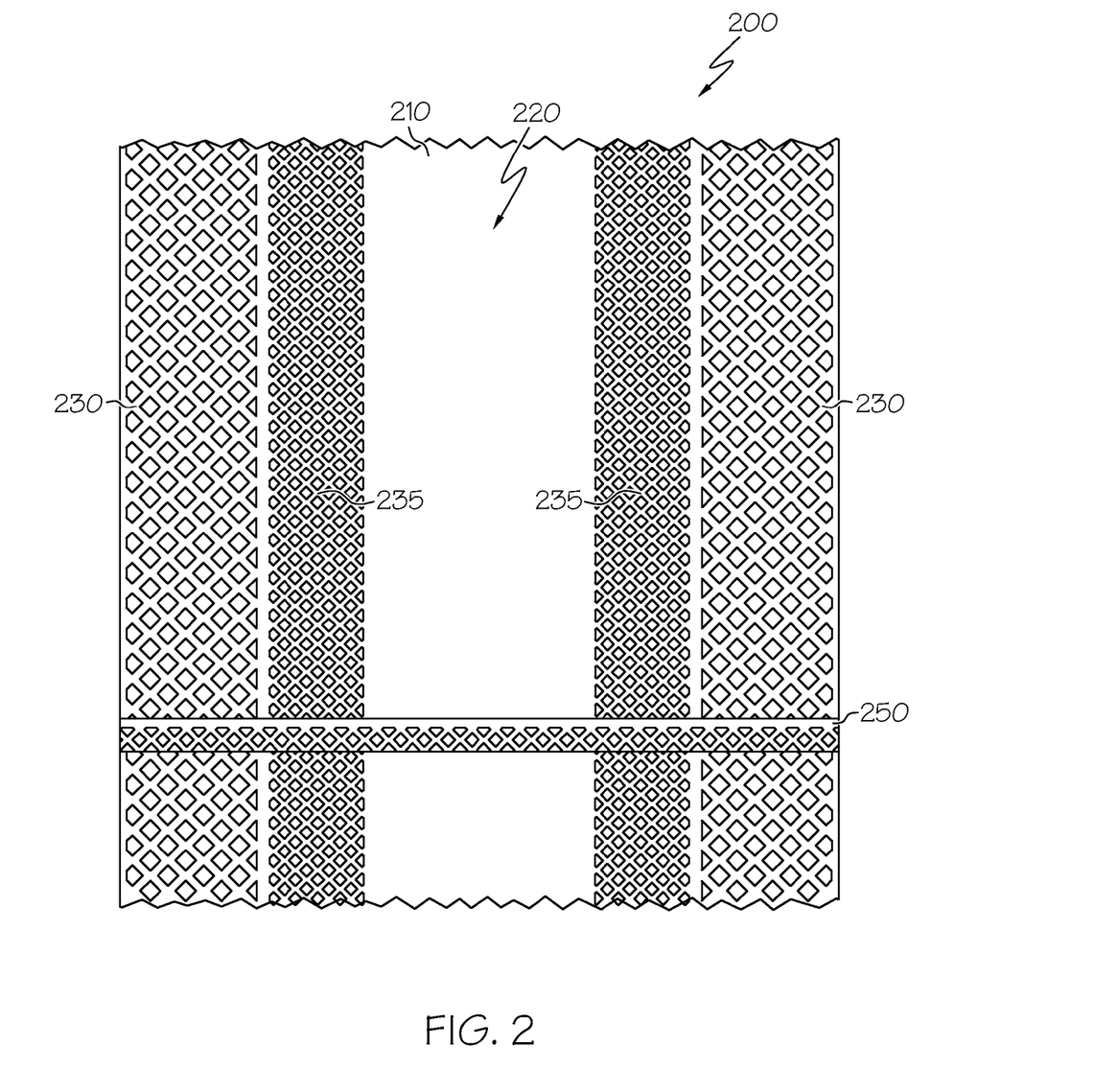
FIG. 2 is an exemplary embodiment of a flex circuit for lightning energy dissipation.

In general, for lightning energy dissipation a circuit pattern should have a sufficient metallized area capable of conducting lightning energy rapidly to a ground such as underlying aircraft structure to which the flex circuit is electrically connected. Thus the circuit pattern should be wide and cover as large an area as necessary without excessive amounts of metal that would add unnecessary weight. The lightning-dissipating circuit pattern may be of a conductive metal such as copper, silver, aluminum, gold, and the like on a dielectric film substrate. FIG. 2 illustrates an exemplary embodiment of a flex circuit film 200 with a lightning protection circuit pattern 210. This flex circuit pattern 210 is designed for lightning protection of wing tank fasteners. The flex circuit pattern 210 has extensive substantially unbroken areas of conductive metal (copper) 220 in the areas around fasteners (not shown) for distribution of the lightning current between neighboring fasteners. The exemplary flex circuit pattern 210 also has more open-patterned metallized areas 230, 235 in areas remote from the fasteners in order to minimize weight. Open pattern metallized areas 230, 235 may also improve the handling characteristics of the circuit and make it more amenable to automated lay-up. Further, the flex circuit pattern 210 may have expansion joints 250 at suitable intervals, such as 30 inches, for example. The expansion joints 250 should be electrically conductive.

Figure 3:
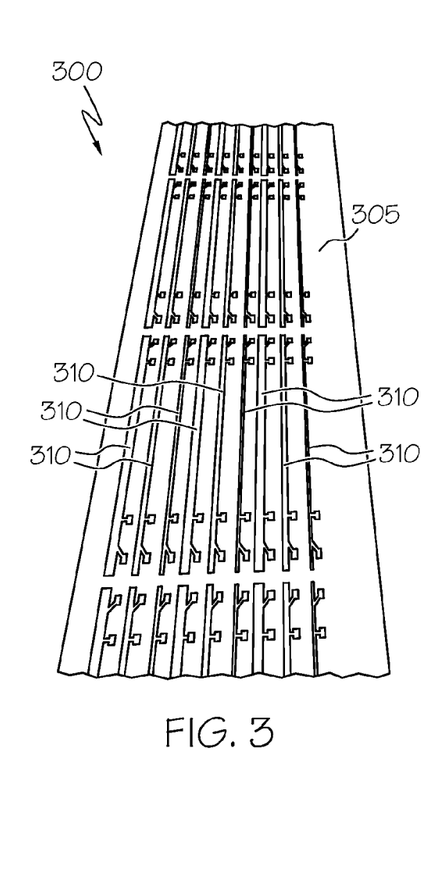
FIGS. 3-5 illustrate non-functional and non-limiting examples of flex circuits that demonstrate circuit pattern shapes.
Figure 4:
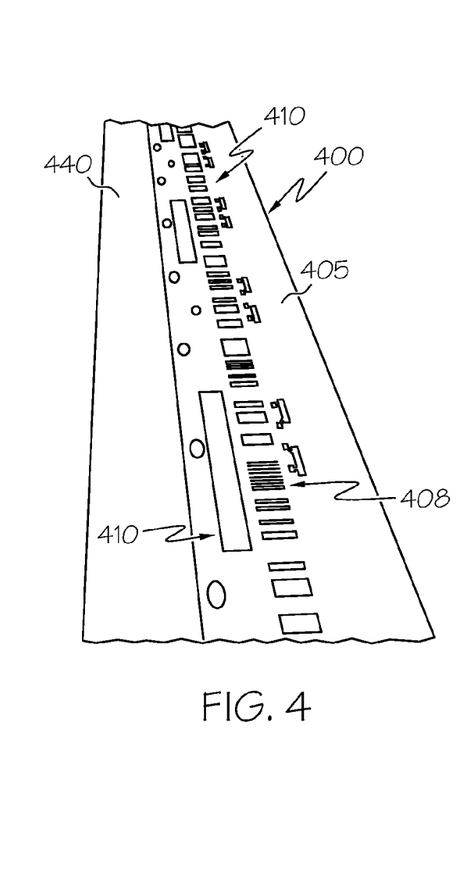
Figure 5:
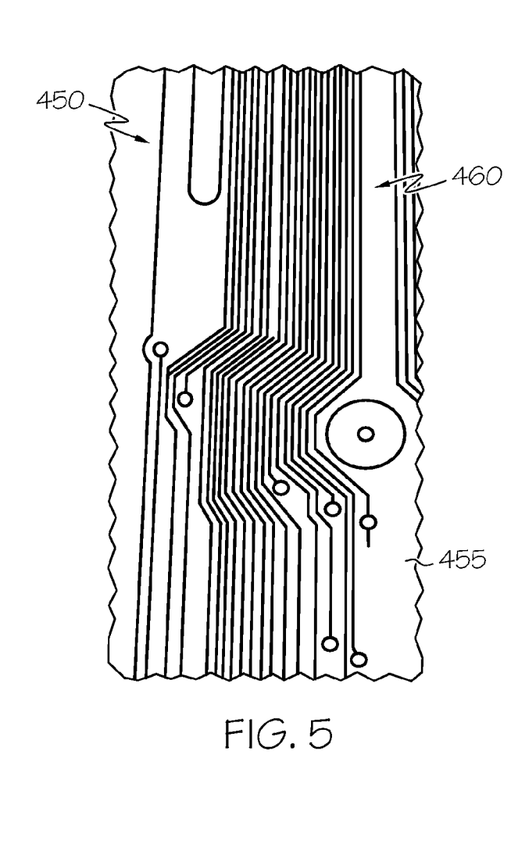

FIGS. 3-5 illustrate three non-functional, proto-type examples of flex circuits that demonstrate the capability to form metallic circuit patterns on a large polymer film. Referring to FIG. 3, the flex circuit 300 on the dielectric substrate (film) 305 measures about 30 inches long and 15 inches wide and includes a circuit pattern 310.

FIG. 4 illustrates another 30 inch long by 15 inch wide flex circuit 400 that has a metallized circuit pattern 410 on a dielectric film substrate 405. While the illustrated example is non-functional, it illustrates that the circuit pattern 410 may include, for example, antennas 408 for embedded radio frequency (RF) devices. As shown, the flex circuit 400 is laid down on a composite 440 with which it will be integrated, by a process such as, for example, by co-curing with the composite 440.

FIG. 5 illustrates another non-functional prototype of a flex circuit 450 that has a metallized flex circuit pattern 460 on a dielectric film substrate 455. This flex circuit 450 illustrates the formation of conductive patterns 460 of the type that may provide for connectivity of present and future applications. These applications may include without limitation, for example: real time monitor of temperature and mechanical excursions, condition of critical lightning protection features, de-icing circuitry, and tuned antenna networks.

In general, when two or more layered flex circuits are used to provide a multi-functional flex circuit, the separate flex circuit layers are separated from each other by dielectric films or dielectric layers, but may interface with each other by suitable electrical interconnection through the dielectric films or layers. These interconnections may be similar to vias in semiconductor or other types of z-axis connection used in electronics packaging technology such as eyelets, Z clips, fuzz buttons and anisotropic conductive adhesive with only z-axis conductivity.

Figure 6:
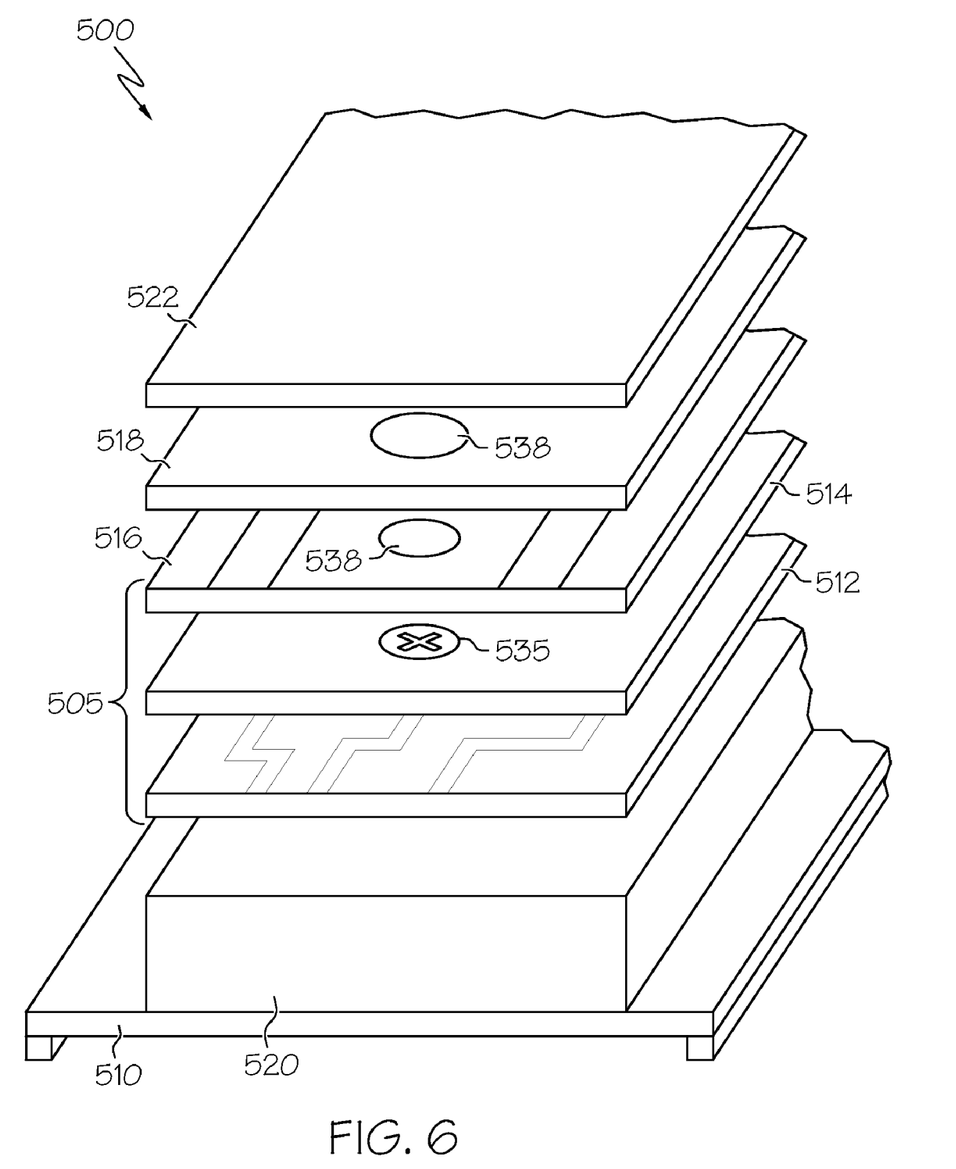
FIG. 6 illustrates an exemplary embodiment of a two-layered multi-functional flex circuit integrated into a composite, in a cross sectional perspective and exploded view to show detail.
Figure 7:
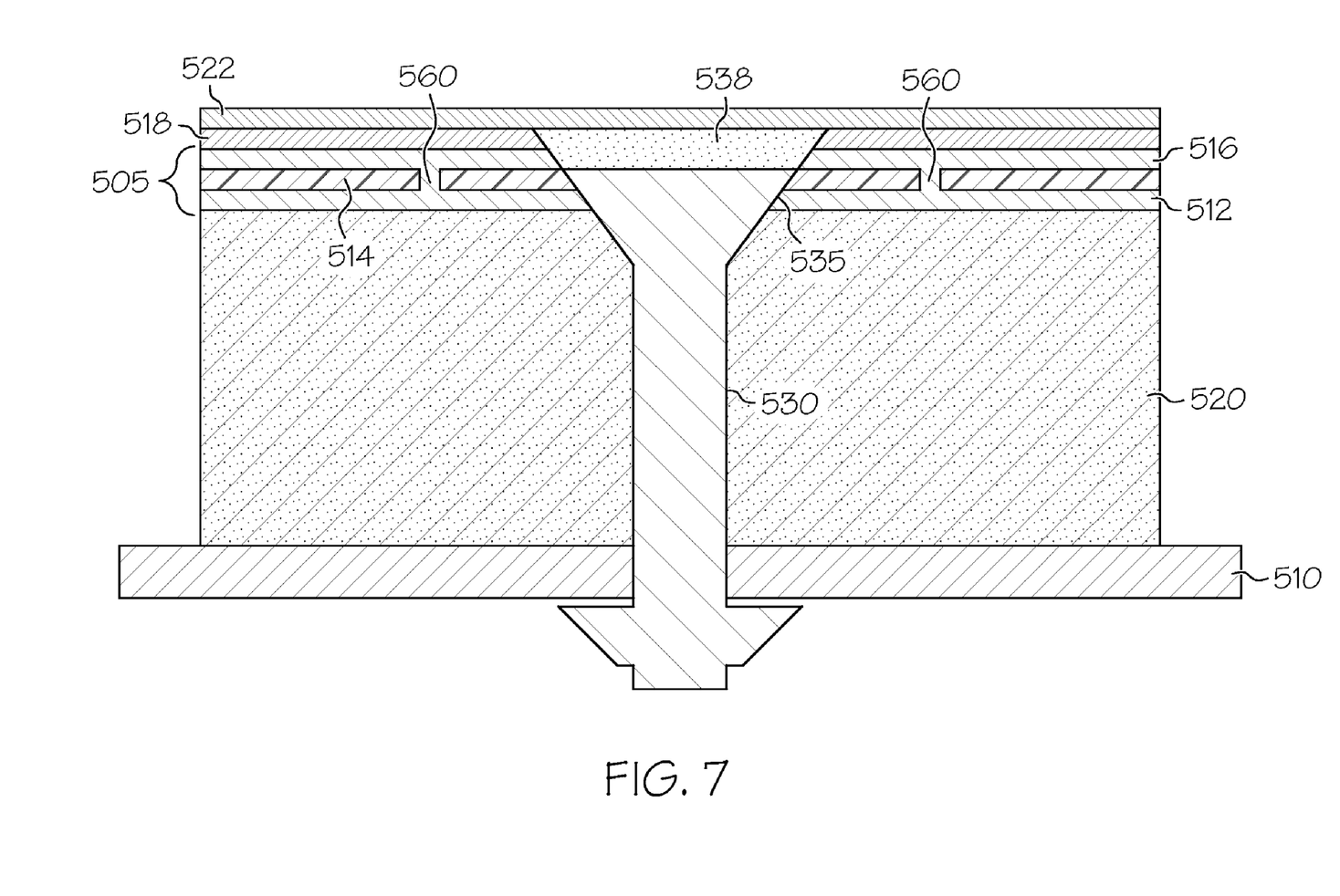
FIG. 7. illustrates the embodiment of FIG. 6 in cross section.

FIG. 6 illustrates an example of an embodiment of a composite aircraft structure 500 that has an integrated multi-functional flex circuit 505. The multi-functional flex circuit 505 may be integrated into the composite structure of an aircraft requiring protection from lightning energy, such as a wing, fuselage, etc., and/or in a location suitable for other functions of the multi-functional flex circuit. In the illustrated example, the substructure 510 may be an epoxy fiber glass surface on the composite 520, which may be carbon-graphite-epoxy. The example of a multi-functional flex circuit 505 in this instance includes two flex circuit layers 512, 516 separated by a dielectric layer 514. More layers may be used, of course, to provide more functions or for convenience. An epoxy-glass surface layer 518 may overlie the upper flex circuit layer 516 and it may in turn coated with the paint system 522. Because metallic fasteners 530 are used to secure the composite 520 to the substructure 510, as seen also in FIG. 7, provision must be made to guard against the potential for undesirable lightning conductivity via the fasteners 530 to substructure 510. In the illustrated example, the fastener head 535 is countersunk to the level of the dielectric layer 514 and the fastener head 535 may be covered with dielectric sealant 538 that extends through the upper flex conductor layer 516, and the epoxy-glass surface layer 522. Accordingly, the fastener head 535 is electrically isolated. As may be seen in FIG. 7, communication lines 560, for example similar to vias in semiconductors, may extend between the two flex circuit layers 516, 512.

Figure 8:
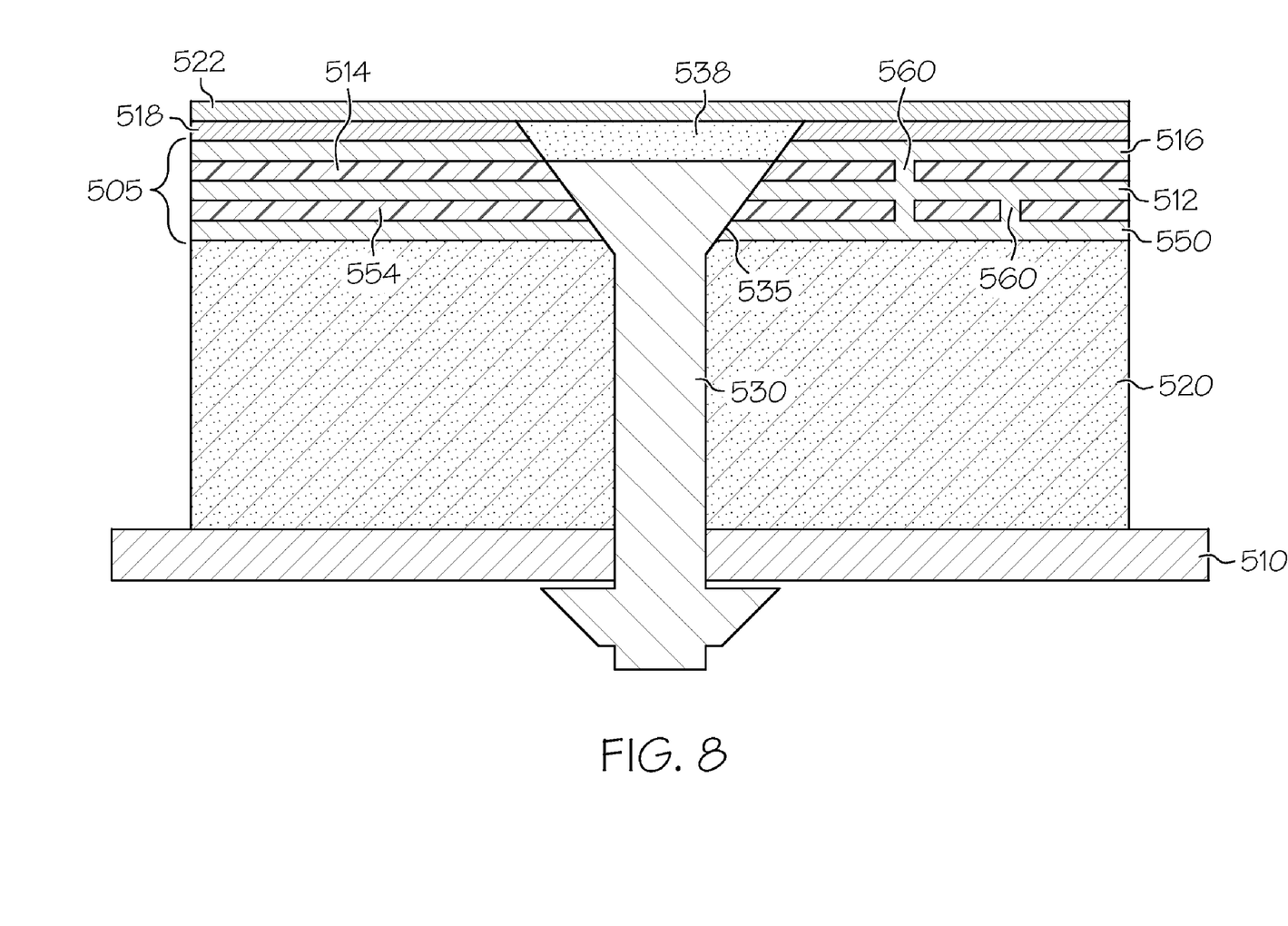
FIG. 8 illustrates a cross sectional view of another exemplary embodiment of a multi-functional flex circuit integrated into a composite

FIG. 8 illustrates another example of an embodiment. In FIG. 8, the multi-functional flex circuit 505 includes three flex circuit layers 516, 514, 550 with intervening dielectric layers 514, 554. The flex circuit layers 516, 514, 550 may communicate with each other in z-axis direction through the intervening dielectric layers 514, 554 by conductive vias or other suitable electronics packaging schemes.

In one embodiment, the multi-functional flex circuit is integrated into the composite substrate (an aircraft wing panel assembly, for example) by a co-cure process. The multi-functional flex circuit (as pre-assembled) is applied to the back of the first layer of epoxy glass, from the tool side, which will produce the outside of the aircraft part. The composite substrate is laid up next in the curing tool and the multi functional flex circuit, as pre-assembled, is applied to the composite substrate surface. The assembly of the composite substrate with the multi-functional flex circuit is then vacuum bagged and the resin of the flex circuit films is co-cured with the resin of the composite substrate to form an integrated structure. The composite skin structure may also be similarly laid up from the bag side, with the multi-functional flex circuit system appropriately inserted in the desired sequence to provide the intended functionalities. The integrated multi-functional flex circuit-containing composite substrate may then be coated with a coating, such as a paint system, as appropriate.

The construction and pre-assembly of multilayer flex circuitry may be done in accord with standard and state-of-art practice in the electronics industry. In the pre-assembly of the multi-functional, multi-layered flex circuit, the separate flex circuits are combined into a flexible stack. The first circuit layer may be laid down and covered with a first dielectric layer. Then, the second flex circuit may be laid on top of the first dielectric layer. Communications between flex circuits may be fabricated in accord with good electronics industry practice. Additional alternating dielectric layers and flex circuit layers may be stacked in the same manner. When the multi-layered flex circuit is complete, it may be rolled up, prepared for automated handling and transported to the composite substrate for co-curing, as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An aircraft component comprising:
   a composite structure; and
   a metalized surface on a film, the film co-cured with the composite structure, the metalized surface patterned to dissipate energy generated by lightning strikes on the composite structure, the metalized surface also patterned to provide a plurality of conductive traces to provide connectivity for multi-function apparatus; and electronic devices electrically connected to the traces.

2. The component of claim 1, the devices including at least one of the following: embedded passive readout devices (EPRDs), embedded active readout devices (EARDs), Rogowski coils for current measurement, thermopiles, thermistors, fuses, radio frequency identification devices (RFIDs) and strain gauges.

3. An aircraft component comprising:
a composite structure;
a first metallic circuit on a film, the film co-cured with the composite structure, the first metallic circuit patterned to dissipate energy generated by lightning strikes on the composite structure, the first metallic circuit also patterned to provide connectivity for multi-function apparatus; and
a second metallic circuit and a dielectric layer interposed between the first and second metallic circuits.

4. The component of claim 3, further comprising a glass epoxy sealant protecting an uppermost of the first and second metallic circuits.

5. The component of claim 3, further comprising communications lines between the first and second metallic circuits.

6. An aircraft component comprising:
a composite structure;
a metallic circuit on a film, the film co-cured with the composite structure, the metallic circuit patterned to dissipate energy generated by lightning strikes on the composite structure, the metallic circuit also patterned to provide connectivity for multi-function apparatus; and
a plurality of metal fasteners; and wherein the metallic circuit is patterned to divert lightning current away from the metal fasteners.

7. The component of claim 6, wherein the aircraft component is one of an aircraft wing, fuselage, tail structures, empennage, nacelle, and nose.

8. The component of claim 6, wherein the metallic circuit has open and closed patterns of metal.

9. An aircraft comprising:
an aircraft composite substructure including an aircraft component, the component including a composite structure and a metallic circuit on a film, the film co-cured with the composite structure, the metallic circuit patterned to dissipate energy generated by lightning strikes on the composite structure, the metallic circuit also patterned to provide connectivity for multi-function apparatus;
a paint system over the component; and
an electrically conductive fastener extending through the aircraft component, the metallic circuit patterned to dissipate lightning energy away from the fastener.

10. The aircraft of claim 9, the component including at least one additional metallic circuit, wherein the at least two metallic circuits are in selective electrical communication through interposed dielectric layers.

11. The aircraft of claim 10, wherein the composite component comprises epoxy resin and carbon graphite, and wherein the film of the at least two circuits comprise polyimide and the metallic circuit comprises copper, aluminum, silver, nickel or gold.

* * * * *